(12) United States Patent
Hackeloeer et al.

(10) Patent No.: US 10,878,258 B2
(45) Date of Patent: Dec. 29, 2020

(54) METHOD FOR DETECTING ROADWORKS

(71) Applicant: Bayerische Motoren Werke Aktiengesellschaft, Munich (DE)

(72) Inventors: Andreas Hackeloeer, Munich (DE); Christian Breil, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 16/111,706

(22) Filed: Aug. 24, 2018

(65) Prior Publication Data

US 2018/0365507 A1 Dec. 20, 2018

Related U.S. Application Data

(63) Continuation of application No. PCT/EP2017/053352, filed on Feb. 15, 2017.

(30) Foreign Application Priority Data

Feb. 25, 2016 (DE) .................. 10 2016 202 973

(51) Int. Cl.
*G06K 9/00* (2006.01)
*G06F 16/29* (2019.01)
(Continued)

(52) U.S. Cl.
CPC ......... *G06K 9/00818* (2013.01); *G01C 21/32* (2013.01); *G06F 16/29* (2019.01);
(Continued)

(58) Field of Classification Search
None
See application file for complete search history.

(56) References Cited

U.S. PATENT DOCUMENTS 6,560,529 B1   5/2003  Janssen
2004/0215377 A1* 10/2004 Yun .................. G01C 21/30
                                                 701/28
(Continued)

FOREIGN PATENT DOCUMENTS

DE        198 42 176 A1    3/2000
DE    10 2006 008 656 A1   8/2007
(Continued)

OTHER PUBLICATIONS

International Search Report (PCT/ISA/210) issued in PCT Application No. PCT/EP2017/053352 dated Jun. 2, 2017 with English translation (six (6) pages).

(Continued)

*Primary Examiner* — Delomia L Gilliard
(74) *Attorney, Agent, or Firm* — Crowell & Moring LLP

(57) ABSTRACT

A method detects roadworks. The method includes steps of: receiving a position of at least one first road sign that indicates the reduction of the maximum permissible top speed to a first vehicle on the current road section on which the first vehicle is travelling by way of a sensor fitted to the first vehicle; receiving a position of at least one second road sign that lifts the reduction of the maximum permissible top speed of a vehicle on the current road section on which the vehicle is travelling by way of the sensor fitted to the first vehicle; determining a first assumption for the position of roadworks from the first position of the at least one first road sign and the first position of the at least one second road sign; and determining a probable position of the roadworks by comparing the first assumption of the position of the roadworks with at least one second assumption that has been determined by at least one second vehicle.

8 Claims, 2 Drawing Sheets

(51) Int. Cl.
*G08G 1/01* (2006.01)
*G01C 21/32* (2006.01)

(52) U.S. Cl.
CPC ....... *G06K 9/00798* (2013.01); *G08G 1/0112* (2013.01); *G08G 1/0133* (2013.01); *G08G 1/0145* (2013.01)

(56) References Cited

U.S. PATENT DOCUMENTS

| | | | | |
|---|---|---|---|---|
| 2009/0169055 | A1* | 7/2009 | Ishikawa | G01C 21/32 382/104 |
| 2013/0101174 | A1* | 4/2013 | Meis | G06K 9/00798 382/104 |
| 2014/0063232 | A1* | 3/2014 | Fairfield | B60T 7/18 348/118 |
| 2014/0309833 | A1* | 10/2014 | Ferguson | B60W 30/00 701/23 |
| 2016/0046290 | A1* | 2/2016 | Aharony | B60W 10/04 701/41 |
| 2016/0170414 | A1* | 6/2016 | Chen | G08G 1/0112 701/27 |
| 2017/0127237 | A1* | 5/2017 | Hayee | H04W 4/023 |
| 2018/0222478 | A1* | 8/2018 | Limbacher | B60W 50/0097 |
| 2018/0237009 | A1* | 8/2018 | Chutorash | B60W 50/10 |
| 2018/0261088 | A1* | 9/2018 | Roy | G08G 1/08 |

FOREIGN PATENT DOCUMENTS

| | | |
|---|---|---|
| DE | 10 2009 036 433 A1 | 5/2010 |
| DE | 10 2012 208 740 A1 | 11/2013 |
| DE | 10 2013 009 856 A1 | 12/2014 |
| DE | 10 2013 217 871 A1 | 3/2015 |
| DE | 10 2014 104 573 A1 | 10/2015 |

OTHER PUBLICATIONS

German-language Written Opinion (PCT/ISA/237) issued in PCT Application No. PCT/EP2017/053352 dated Jun. 2, 2017 (six (6) pages).

German-language Search Report issued in counterpart German Application No. 102016202973.8 dated Jan. 9, 2017 with partial English translation (twelve (12) pages).

* cited by examiner

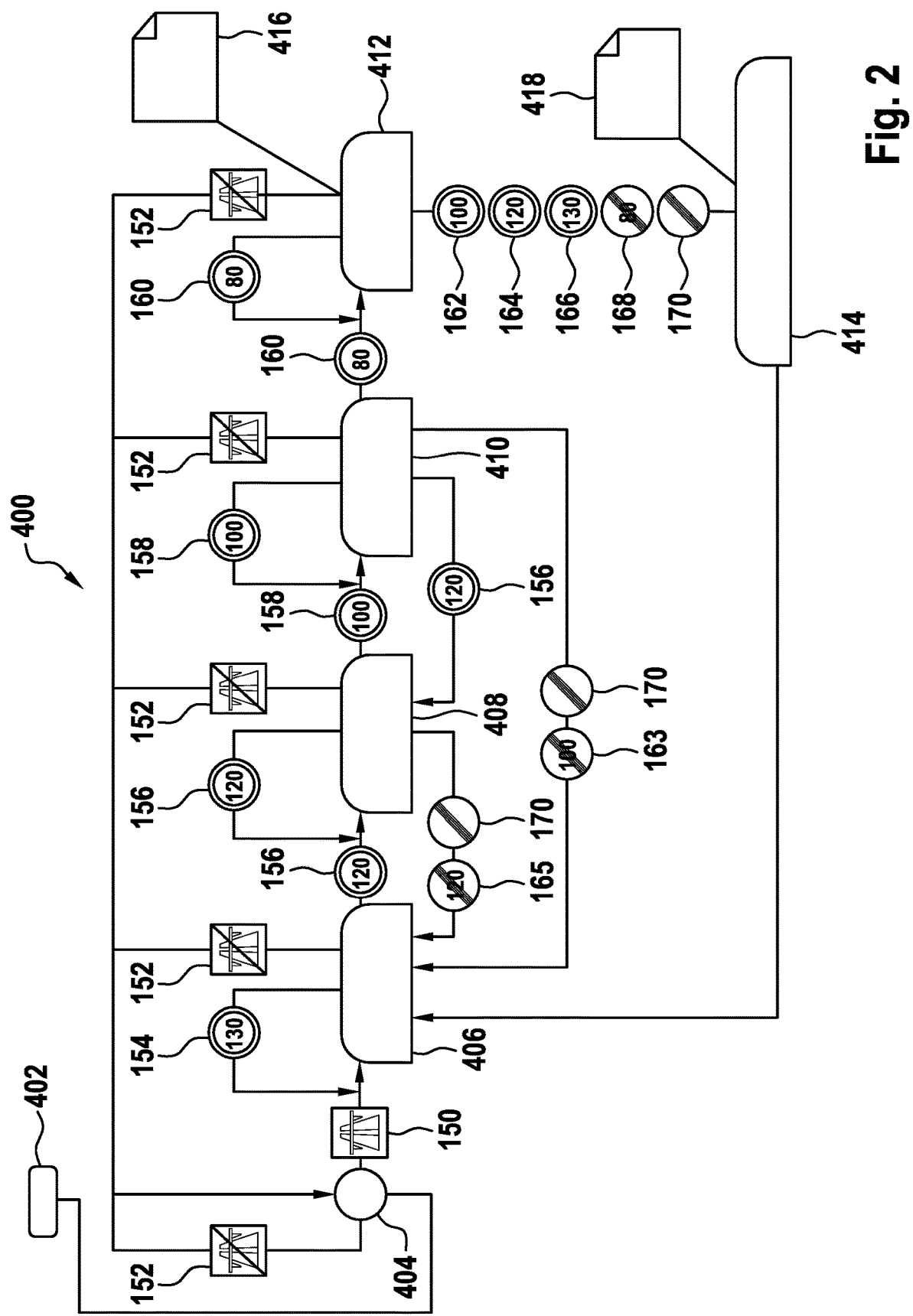

METHOD FOR DETECTING ROADWORKS

CROSS REFERENCE TO RELATED APPLICATIONS

This application is a continuation of PCT International Application No. PCT/EP2017/053352, filed Feb. 15, 2017, which claims priority under 35 U.S.C. § 119 from German Patent Application No. 10 2016 202 973.8, filed Feb. 25, 2016, the entire disclosures of which are herein expressly incorporated by reference.

BACKGROUND AND SUMMARY OF THE INVENTION

The present invention relates to a method for detecting a roadworks, in particular a roadworks on a freeway.

A navigation system of a vehicle receives information about roadworks by means of so-called real-time traffic information (RTTI Real-time Traffic Information) services. These services are informed about planned and existing roadworks by, for example, government agencies and/or road operators. Tables into which the beginning and end of roadworks are entered for a freeway section are generated from this. Such services can be made available by a manufacturer of a navigation system, an automobile association or the like.

The information about roadworks is used in the planning of routes and in the calculation of journey time in order to propose as short a route as possible to a user of a vehicle. The flow of traffic can, furthermore, be altogether accelerated if as few vehicles as possible travel on a route segment with a roadworks.

Depending on the completeness, actuality, accuracy and correctness of the sources for roadworks information, the information supplied to a navigation device frequently only inadequately corresponds to the reality. As a result of organizational circumstances and the progress of the work, the location, course and extent of a roadworks can vary without this data being included in the real-time traffic information referred to above. Deviations between the planning of a roadworks and the actual situation on the road lead to inaccuracies and faults in the real-time traffic information service based on them. This has the result that the location and time when roadworks are found is either not reported or not reported correctly. The planning of a route and the calculation of the travel time are made more difficult as a result.

DE 10 2006 008 656 A1 discloses a vehicle with an apparatus for road sign detection.

DE 10 2012 208 740 A1 discloses a learning map and a roadworks information.

DE 198 42 176 A1 discloses the updating of navigation data through recognized road signs.

It is an object of the invention to provide an improved method for detecting roadworks.

This and other objects are achieved by a method according to the invention for detecting a roadworks, which comprises the step of receiving a position of at least one first road sign that indicates the reduction of the maximum permissible top speed on a road section on which the first vehicle is travelling, wherein the at least one first road sign is detected by way of a sensor fitted to the first vehicle. The method according to the invention further comprises the step of receiving a position of at least one second road sign that lifts the reduction of the maximum permissible top speed of a vehicle on the current road section on which the vehicle is travelling, wherein the at least one second road sign is detected by way of a sensor fitted to the first vehicle. The method determines a first assumption as to the position of a roadworks from the position of the at least one first road sign and the position of the at least one second road sign. The method determines a probable position of the roadworks through comparison of the first assumption as to the position of the roadworks with at least one second assumption that has been determined by at least one second vehicle.

The method according to the invention determines the probable position of a roadworks on the basis of data that is transmitted from a plurality of vehicles. Preferably the roadworks is a freeway roadworks. The beginning position and the end position of the roadworks are determined from the first position and the second position. The at least one road sign can comprise a plurality of road signs that indicate a successive restriction in speed, as is, for example, typical at roadworks. Such a plurality of road signs can form a funnel or pipe with successive speed restrictions.

The data about the roadworks are determined by use of a so-called crowd-sourcing method in which the vehicles of the road users generate data for determining the position of the roadworks. In this way it is possible to generate current data for roadworks with comparatively little effort. The current position of moving roadworks can, furthermore, be acquired. The position of the at least one first road sign and the position of the at least one second road sign are acquired by a vehicle and can be transmitted to a central unit (backend).

The method further comprises the reception of the position of at least one first road sign that indicates the reduction of the top speed to the second vehicle on a road section on which the second vehicle is travelling, wherein the at least one first traffic sign is detected by way of a sensor fitted to the second vehicle. The method further comprises the step of receiving the position of at least one second road sign that lifts the reduction of the maximum permissible top speed of a vehicle on the road section on which the second vehicle is travelling, wherein the at least one second traffic sign is detected by way of a sensor fitted to the second vehicle. The method further comprises the step of determining a second assumption as to the position of the roadworks from the second position of the at least one road sign and the second position of the at least one second road sign. Both the first assumption and all second assumptions are determined by the vehicles of the road users. The more second assumptions that are present, the more precisely it is possible to determine whether roadworks are present, and where the roadworks are located. The first position and the second position can be determined by means of a GNSS sensor as soon as the first or second road sign is detected.

The method further comprises the step of receiving the actual speed of the vehicle at least between the position of the first road sign and the position of the second road sign. The actual speed can be an average speed between the position of the first road sign and the position of the second road sign. The actual speed or the average speed can be transmitted from each vehicle to the central unit.

The method can further comprise the step of receiving the actual trajectory of the vehicle at least between the position of the first road sign and the position of the second road sign. The traffic flow is often changed, in particular at freeway roadworks, which can be an indication of roadworks. The trajectory can be acquired by a GNSS sensor (a satellite-assisted position acquisition system) and/or by an imaging sensor, for example a camera, a RADAR sensor, a LIDAR sensor, or the like.

The method further comprises the step of transmitting the position of the at least one first road sign from the vehicle to a central unit. The method further comprises the transmission of the position of the at least one second road sign from the vehicle to the central unit. The method further comprises the transmission of the actual trajectory of the vehicle at least between the position of the first road sign and the position of the second road sign from the vehicle to the central unit. The method further comprises the step of transmitting the actual speed at least between the position of the first road sign and the position of the second road sign to the central unit. The method can further comprise the step of the transmission of the average speed at least between the position of the first road sign and the position of the second road sign from the vehicle to the central unit. The position of the first road sign, the second road sign, the actual trajectories, the actual speed and/or the average speed can be determined by a plurality of vehicles and transmitted for evaluation to the central unit (backend).

The method can determine the starting position of the roadworks and/or the end position of the roadworks from the position of the at least one first road sign that shows the beginning of a roadworks and the position of the at least one second road sign that indicates the end of the roadworks. Alternatively to this, or in addition, the method can determine and/or verify the starting position of the roadworks and/or the end position of the roadworks from the acquired actual speed of the vehicle at least between the position of the first road sign and the position of the second road sign. In the region of a roadworks, the actual speed is usually lower than in a road section without roadworks. Alternatively to this, or in addition, the method can determine and/or verify the starting position and/or the end position of the roadworks on the basis of the acquired average speed of the vehicle at least between the position of the first road sign and the position of the second road sign. The average speed is in general lower on a road section with roadworks than on a road section without roadworks.

Alternatively to this, or in addition, the method can determine the starting position and/or the end position of the roadworks on the basis of the acquired actual trajectory of the vehicle at least between the position of the first road sign and the position of the second road sign. The arrangement of traffic lanes is usually changed at a roadworks. This deviation can indicate the presence of a roadworks.

The method can comprise the step of determining the starting position of the roadworks and/or the end position of the roadworks through comparison of the position of the at least one first road sign with a position of road signs stored in a database and/or the comparison of the position of the at least one second road sign with a position of road signs stored in the database. If the database indicates that no road signs are present at the position of the at least one first road sign and/or at the position of the at least one second road sign, the method can assume that the at least one first road sign indicates the beginning of a roadworks and the at least one second road sign the end of a roadworks.

As an alternative to this, or in addition, the method can comprise the comparison of the acquired actual speed of the vehicle at least between the position of the first road sign and the position of the second road sign with a speed between the position of the first road sign and the position of the first road sign stored in the database. The speed stored in the database can be an average speed, a nominal speed or the like. A low speed between the position of the at least one first road sign and the position of the at least one second road sign can indicate to the method that roadworks are located between the position of the at least one first road sign and the position of the at least one second road sign.

As an alternative to this, or in addition, the method can compare the acquired average speed of the vehicle between the position of the first road sign and the position of the second road sign with an average speed between the position of the first road sign and the position of the second road sign stored in the database. A reduced average speed in the region between the at least one first road sign and the at least one second road sign can be interpreted by the method as the presence of a roadworks between the position of the at least one first road sign and the position of the at least one second road sign.

As an alternative to this, or in addition, the method can compare the acquired actual trajectory of the vehicle at least between the position of the at least one first road sign and the position of the at least one second road sign with a nominal trajectory stored in the database. Deviations between the nominal trajectory and the actual trajectory that can occur in the region of roadworks as a result of changed arrangement of traffic lanes can be determined in this way.

The method can furthermore discard an assumption that there can be roadworks between the first position of the at least one first road sign and the position of the at least one second road sign if a speed limit is stored in the database between the position of the at least one first road sign and the position of the at least one second road sign. This speed limit can be set up permanently as a result of structural circumstances, for example bends, freeway accesses, tunnels or the like. The at least one first road sign and the at least one second road sign can consequently not be interpreted as an indication of roadworks.

If a road configuration that necessitates a reduction of the travel speed is stored in the database between the position of the at least one first road sign and the position of the at least one second road sign, the assumption that a roadworks can be present between the position of the at least one first road sign and the position of the at least one second road sign can be discarded. The road configuration can be a tunnel, a bridge, a freeway interchange, a freeway access or the like.

The method can discard the assumption that there are roadworks between the position of the at least one first road sign and the position of the at least one second road sign if the actual trajectories do not deviate from the nominal trajectory between the position of the at least one first road sign and the position of the at least one second road sign. This can occur if maintenance work, for example cutting vegetation, mowing or the like is carried out in the region of the road. These only represent a slight impairment to the traffic flow, and should not be taken into account for route guidance.

The method can give an assumption that indicates the presence of roadworks between the position of the at least one first road sign and the position of the at least one second road sign a greater weighting the more vehicles within a predetermined period of time support a first assumption that roadworks are located between the position of the at least one first road sign and the position of the at least one second road sign. The method can give an assumption that indicates the presence of roadworks between the position of the at least one first road sign and the position of the at least one second road sign a lower weighting the fewer vehicles within a predetermined period of time support an assumption that roadworks are located between the position of the at least one first road sign and the position of the at least one second road sign. A vehicle can support an assumption that roadworks are located at a road section if at least one first road sign, at least one second road sign, a difference between the actual trajectory and a trajectory stored in the database, a deviation of the actual speed from a speed stored in the database, for example a lower actual speed, is determined and/or a deviation of the actual speed from an average speed stored in the database, for example a lower actual speed, is determined.

The invention also relates to a computer program product that carries out the steps of the previously described method when it is loaded into a memory of a computer with a processor.

The invention also relates to a control apparatus that is designed to carry out the previously described steps. The control apparatus can be a computer with means for transmitting and receiving messages.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a state machine in a central unit.

DETAILED DESCRIPTION OF THE DRAWINGS

Figure 1:
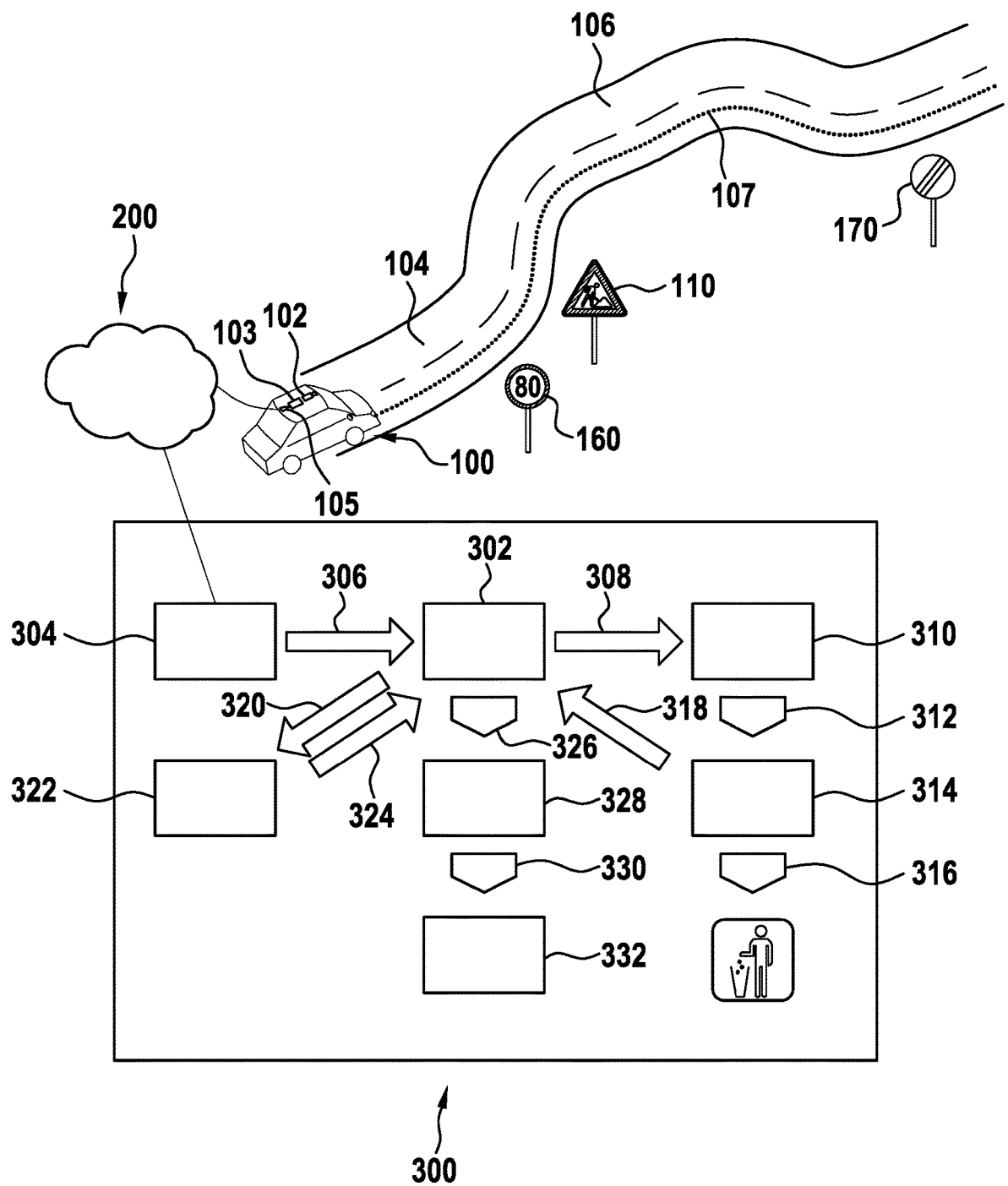
FIG. 1 schematically shows a first form of embodiment of the invention.

The method will be described below in connection with the detection of freeway roadworks, wherein a stream of data provided by a vehicle is evaluated. Roadworks are extracted from this stream of data and are again compared with data from other vehicles and or other knowledge about the respective road section, in order to prepare an assumption for the existence of roadworks.

Reference is made to FIG. 1, which shows a vehicle 100 with a camera 102 pointing forwards, a position sensor 103, for example a GNSS sensor, and a communication device 105. The vehicle can be a motor vehicle, for example a passenger car. The vehicle 100 travels on a freeway segment 104 where roadworks are located. A first road sign 160 is located in the region of the roadworks, indicating a speed limit. The trajectory 107 of the freeway furthermore changes in the region of the roadworks 106. The camera 102 captures on the one hand the road signs 160, 170 and on the other hand the trajectory 107 of the vehicle 100. The trajectory of the vehicle can also be captured by the position sensor 103. The camera 102 can capture the road sign 110 that indicates a roadworks.

The camera can also capture a second road sign 170 that indicates the lifting of a speed limit. The vehicle 100 can furthermore determine the actual speed by means of the position sensor 103 or through the speed of rotation of the wheels.

The vehicle transmits the acquired events, which for example comprise the detection of the first road sign 160, the detection of the second road sign 170, the actual trajectory 107 and/or the acquired actual speed, over a wireless network connection 200 to a receiving device 304 of a remote device 300 that forwards candidates for roadworks from the received events.

The events received by the receiving device 304 comprise the type of the event and a position, for example a GNSS position. The received events are forwarded by the receiving device 304 via a communication connection 306 to a control device 302 which passes the received events on to a roadworks detection device 310 via a communication connection 308. The roadworks detection device 310 is described in more detail below with reference to FIG. 2.

FIG. 2 shows a state machine 400 of the roadworks detection device 310. At the start of the method 402, the state machine enters a state 404 in which it is unknown whether the vehicle is on a freeway. This state will be referred to below as the idle state. If a road sign 152 that indicates the end of a freeway is detected by the camera, the state machine remains in the idle state. As soon as the camera detects a road sign 150 that indicates the beginning of a freeway, the state machine enters into the freeway state 406. When the camera acquires a road sign 154 that indicates a speed limit of 130 km/h, the state machine remains in the freeway state 406. When the camera acquires a road sign 152 that indicates the end of the freeway, the state machine returns to its idle state 404.

As soon as the camera acquires a road sign 156 that indicates a speed limit of 120 km/h, the state machine 400 enters the beginning of deceleration zone state 408. If the camera acquires a road sign 156 that again indicates a speed limit of 120 km/h, the state machine 400 remains in the beginning of deceleration zone state. As soon as the camera acquires a road sign 152 that indicates the end of the freeway, the state machine 400 enters the idle state 404. If the camera acquires a road sign 165 that lifts the speed limit of 120 km/h, or acquires a road sign 170 that lifts all restrictions, the state machine 400 returns to the freeway state 406.

If the camera acquires a road sign 158 that indicates a speed limit of 100 km/h, the state machine 400 enters the middle of deceleration zone state 410. If the camera again acquires a road sign 158 that indicates a speed limit of 100 km/h, the state machine 400 remains in the middle of deceleration zone state. If the camera detects a road sign 156 that indicates a speed limit of 120 km/h, the state machine returns to the beginning of deceleration zone state 408. If the camera detects a road sign 163 that lifts a speed limit of 100 km/h, or detects a road sign 170 that lifts all restrictions, the state machine returns to the freeway state 406.

If the camera detects a road sign 160 that previously was, for example, identified as the first road sign, that indicates a speed limit of 80 km/h, the state machine enters the beginning of roadworks state. At the same time the position of the road sign 160 is stored in step 416 as the beginning of roadworks. If the camera detects a road sign 160 that again indicates a speed limit of 80 km/h, the state machine remains in the beginning of roadworks state 412. If the camera detects a road sign 152 that indicates the end of the freeway, the state machine returns to the idle state 404.

As soon as the camera detects a road sign that lifts the speed limit of 80 km/h, which previously had been identified as the second road sign, the state machine enters the end of roadworks state 414. The position of the roadworks end is stored in step 418. The second road sign that lifts the speed limit of 80 km/h can be a road sign 162 that indicates a speed limit of 100 km/h, a road sign 164 that indicates a speed limit of 120 km/h, and a road sign 166 that indicates a speed limit of 130 km/h. The second road sign can be a road sign 168 that lifts a speed limit of 80 km/h or a road sign 170 that lifts all speed restrictions. The state machine 400 returns from the end of roadworks state 414 to the freeway state 406. The position of the first road sign 160 can be a candidate for a beginning of roadworks, and the position of the second road sign 162, 164, 166, 168, 170 can be a candidate for an end of roadworks. The candidate for a beginning of roadworks and the candidate for an end of roadworks form an assumption for a roadworks.

Reference is again made to FIG. 1. The roadworks detection device 310 outputs candidates for a beginning of roadworks 416 and candidates for an end of roadworks 418 to a first filter 314. The first filter 314 checks whether a permanent speed limit is stored in a database, for example a navigation database, for example as a result of a tunnel, a freeway entrance or the like, in the region between the beginning of roadworks and the end of roadworks. If this is the case the candidates for a beginning of roadworks and an end of roadworks are discarded in step 316.

Otherwise, the candidates for the beginning of roadworks and the end of roadworks are passed through step 318 to the control device 302. The control device 302 forwards the candidates for a beginning of roadworks and for an end of roadworks through the connection 320 to a plausibility checking device 322. The plausibility checking device 322 checks how many vehicles have, in a predetermined time interval, supplied similar candidates for a beginning of roadworks and/or an end of roadworks. The number of candidates generated can be compared with the number of vehicles that have travelled through the route segment concerned. Through this, a quality for the candidates and/or the assumption for the beginning of roadworks and the end of roadworks can be determined. The plausibility checking device 322 can furthermore, check whether a road sign 110 indicating a beginning of roadworks has been acquired or has had its acquisition transmitted. The quality can be increased for such a roadworks.

The candidates or assumptions for the beginning of roadworks and/or the end of roadworks are forwarded in the form of embodiment described in FIG. 2 via the connection 324 to the control device 302 and from there to a second filter 328. The second filter 328 checks whether the quality for the candidates and/or for the assumption for the beginning of roadworks and/or the end of roadworks exceeds a predetermined threshold value. If the quality exceeds the predetermined threshold value, the roadworks is entered via the connection 330 into the list of detected roadworks 332. If the quality for a candidate and/or an assumption for a roadworks falls below the predetermined threshold value, the roadworks can be removed from the list of detected roadworks 332. This makes it possible for roadworks that have changed or are no longer present to be removed from the list. It is furthermore possible for the updated position of moving roadworks to be determined.

The quality can be reduced depending on the time. In this way, roadworks can be removed from the list of detected roadworks 332 if they are not regularly confirmed by vehicles that pass through the road section concerned. The quality can be lowered more quickly the more vehicles pass through the road section concerned and do not supply an assumption for a roadworks between the first and the second road signs. A roadworks can, furthermore, be deleted from the list of roadworks if, within a predetermined period of time, for example one day or one week, they are no longer confirmed by a vehicle.

The present invention provides a method with which the vehicles of road users supply current positions of roadworks. The quality of navigation devices can be improved in this way.

The received list of roadworks can be integrated into the vehicle in the usual way as an RTTI service, in order to inform the driver about roadworks. Said information can, furthermore, also be evaluated in other ways, in that the quality of the detection can be further improved through classifying the geometry of a roadworks detection (for example the detection of a diversion onto the opposing carriageway), and further data, for example the average speed of travel at the roadworks, can be employed in route calculations. In addition, the criticality (danger and/or narrowness) of a roadworks can be read from the assemblage of trajectories assigned to a roadworks. This information can also be presented via an RTTI service to the driver and employed for the evaluation of a route.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting a roadworks, the method comprising the steps of:
    receiving a position of at least one first road sign that indicates a reduction of a maximum permissible top speed on a road section on which a first vehicle is travelling, wherein the first road sign is detected via a sensor fitted to the first vehicle;
    receiving a position of at least one second road sign that lifts the reduction of the maximum permissible top speed of a vehicle on a current road section on which the first vehicle is travelling, wherein the second road sign is detected via the sensor fitted to the first vehicle;
    determining a first assumption as to a position of a roadworks from the position of the at least one first road sign and the position of the at least one second road sign;
    determining a probable position of the roadworks through comparison of the first assumption as to the position of the roadworks with at least one second assumption that has been determined by at least one second vehicle; and
    receiving an actual speed of the vehicle at least between the position of the first road sign and the position of the second road sign;
    wherein the actual speed is an average speed at least between the position of the first road sign and the position of the second road sign.

2. The method as claimed in claim 1, wherein the second assumption is determined through the following steps:
    receiving a second position of at least one first road sign that indicates the reduction of the top speed on a road section on which the second vehicle is travelling, wherein the first road sign is detected via a sensor fitted to the second vehicle; and
    receiving a second position of at least one second road sign that lifts the reduction of the maximum permissible top speed of a vehicle on a current road section on which the second vehicle is travelling, wherein the second road sign is detected via a sensor fitted to the second vehicle; and
    determining the second assumption as to the position of the roadworks from the second position of the at least one first road sign and the second position of the at least one second road sign.

3. The method as claimed in claim 1, further comprising the step of:
    receiving an actual trajectory of the vehicle at least between the position of the first road sign and the position of the second road sign.

4. The method as claimed in claim 1, further comprising the steps of:
- transmitting the position of the at least one first road sign from the vehicle to a central unit;
- transmitting the position of the at least one second road sign from the vehicle to the central unit;
- transmitting the actual trajectory of the vehicle at least between the position of the first road sign and the position of the second road sign from the vehicle to the central unit;
- transmitting the actual speed at least between the position of the first road sign and the position of the second road sign from the vehicle to the central unit; and
- transmitting the average speed at least between the position of the first road sign and the position of the second road sign from the vehicle to the central unit.

5. The method as claimed in claim 4, further comprising the step of:
- determining a starting position of the roadworks and/or an end position of the roadworks from at least one of the following:
- the position of the at least one first road sign;
- the position of the at least one second road sign;
- the acquired actual speed of the vehicle at least between the position of the first road sign and the position of the second road sign;
- the acquired average speed of the vehicle at least between the position of the first road sign and the position of the second road sign;
- the acquired actual trajectory of the vehicle at least between the position of the first road sign and the position of the second road sign.

6. The method as claimed in claim 5, wherein the step of determining the starting position of the roadworks and/or the end position of the roadworks comprises at least one of the following steps:
- comparing the position of the at least one first road sign with a position of road signs stored in a database;
- comparing the position of the at least one second road sign with a position of road signs stored in the database;
- comparing the acquired actual speed of the vehicle at least between the position of the first road sign and the position of the second road sign with a speed between the position of the first road sign and the position of the second road sign stored in the database;
- comparing the acquired average speed of the vehicle at least between the position of the first road sign and the position of the second road sign with an average speed between the position of the first road sign and the position of the second road sign stored in the database;
- comparing the acquired actual trajectory of the vehicle at least between the position of the first road sign and the position of the second road sign with a nominal trajectory stored in the database.

7. The method as claimed in claim 6, further comprising at least one of the following steps:
- if a speed limit is stored in the database between the position of the at least one first road sign and the position of the at least one second road sign, discard the assumption that a roadworks can be present between the position of the at least one first road sign and the position of the at least one second road sign;
- if a road configuration that necessitates a reduction of the travel speed is stored in the database between the position of the at least one first road sign and the position of the at least one second road sign, discard the assumption that a roadworks can be present between the position of the at least one first road sign and the position of the at least one second road sign; and
- if the actual trajectory does not differ from the nominal trajectory between the position of the at least one first road sign and the position of the at least one second road sign, discard the assumption that a roadworks can be present between the position of the at least one first road sign and the position of the at least one second road sign.

8. The method as claimed in claim 2, further comprising at least one of the following steps:
- giving an assumption that indicates the presence of roadworks between the position of the at least one first road sign and the position of the at least one second road sign a greater weighting the more vehicles within a predetermined period of time support a first assumption that roadworks are located between the position of the at least one first road sign and the position of the at least one second road sign; and
- giving an assumption that indicates the presence of roadworks between the position of the at least one first road sign and the position of the at least one second road sign a lower weighting the fewer vehicles within a predetermined period of time support a first assumption that there are roadworks between the position of the at least one first road sign and the position of the at least one second road sign.

* * * * *